No. 709,846. Patented Sept. 23, 1902.
J. A. YOUNG.
AMMONIA GENERATOR.
(Application filed June 3, 1901.)
(No Model.)
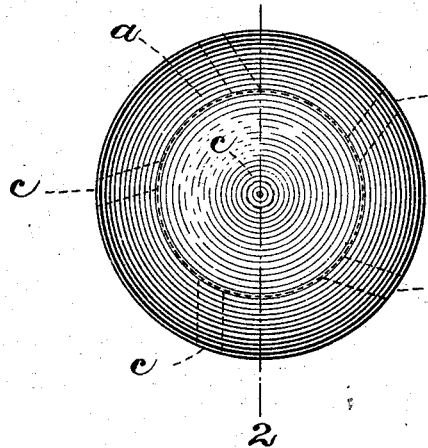
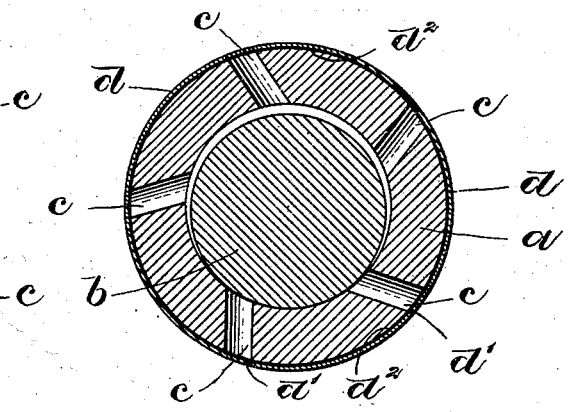
WITNESSES:
INVENTOR:

UNITED STATES PATENT OFFICE.

JAMES A. YOUNG, OF NYACK, NEW YORK, ASSIGNOR, BY DIRECT AND MESNE ASSIGNMENTS, TO CONRAD DOERSCH, TRUSTEE, OF NYACK, NEW YORK.

AMMONIA-GENERATOR.

SPECIFICATION forming part of Letters Patent No. 709,846, dated September 23, 1902.

Application filed June 3, 1901. Serial No. 62,889. (No model.)

*To all whom it may concern:*

Be it known that I, JAMES A. YOUNG, of Nyack, in the county of Rockland and State of New York, have invented certain new and useful Improvements in Ammonia-Generators, of which the following is a specification.

This invention has for its object to provide a convenient and simple substitute in solid form for the liquid ammonia or ammoniacal solution generally used for softening water for laundry use; and it consists in an ammonia-generator composed of an outer soluble member and an inner soluble member inclosed by the outer member, one member being composed of an ammonium salt and the other of a caustic alkali, the outer member being provided with orifices which admit water to both members simultaneously, so that when the generator is immersed in water the water will come in contact with parts of both members, the result being an immediate generation of ammonia, which is set free in sufficient quantity to properly impregnate the water, as will be described hereinafter.

Of the accompanying drawings, forming a part of this specification, Figure 1 represents a side view of an ammonia-generator embodying my invention. Fig. 2 represents a sectional view of the same.

The same reference characters indicate the same parts in both figures.

In the embodiment of my invention here shown $a$ represents the outer member, which is a hollow sphere composed of an ammonium salt, such as the carbonate, sulfate, chlorid, or nitrate of ammonia, preferably the carbonate. $b$ represents the inner member or core, which is a solid ball inclosed in the outer member and composed of a caustic alkali, preferably sodium hydrate. The said members may be made either mechanically, as by turning them from solid blocks of the materials specified, or the outer member may be made by a chemical deposition of gases that in combination form ammonium carbonate, such gases being anhydrous caustic ammonium and carbonic gas, these being brought into contact within a suitable spherical mold, forming therein a solid sphere.

The outer member $a$ is provided with orifices $c$, extending through its wall, to receive water and conduct it to the inner member when the generator is immersed in a body of water. The contact of the water with the walls of the orifices $c$ and with the inner member liberates a much larger volume of gases than could be accomplished by the action of the water on the outer member only. The gas thus formed flows outward through the orifices $c$ with considerable force. I utilize this force to rotate the generator by making the orifices $c$ tangential, or approximately so, to the periphery of the inner member, so that the streams of gas react on the surrounding liquid and on the bottom of the vessel and cause the generator to roll on said bottom, thus distributing the ammonia more evenly than would be the case if the generator remained in one place.

To prevent the periphery of the outer member from being dissolved when the generator is first immersed, I cover it with a shell or envelop $d$, composed of any suitable material or composition that is not quickly soluble in water, but preferably of such nature that it will be dissolved after the members $a$ and $b$ have been substantially consumed. Said envelop may be composed, for example, of gelatin and chromic acid or gelatin and bichromate of potassia and may be applied by dipping the generator in the composition of which the envelop is formed while said composition is in a plastic or semifluid condition. Portions of the envelop extend across the orifices $c$ and form caps $d'$, which protect the soluble surfaces of the members from the action of the air, preventing evaporation of ammonia, &c. These caps may be readily broken or penetrated with a pin to admit water when the generator is to be used.

The inner member $b$ is preferably of such diameter that it is loose in the outer member, so that a space exists between the two members, the walls of the space presenting large areas of surface to the water.

When the outer member is made of ammonium sulfate, the inner member may be made of calcium hydrate, in which case the sulfur having a greater affinity for the calcium than for the hydrogen the calcium would give up the hydrogen and take up the sulfur, freeing the ammonia to its full volume.

It is my purpose to make the generators of such size that each contains no more than enough material to charge the body of water in which it is placed, the generator being entirely consumed in charging said body. The materials of the generator are so inexpensive that the cost to the user will not materially exceed that of liquid ammonia, while the convenience to both the user and the dealer will be much greater, no bottles and expensive bottle-stoppers being required. There is also a marked saving in expense of transportation as compared with liquid ammonia. The body of the generator may be coated with a layer $d^2$ of paraffin before the envelop $d$ is applied to it, the paraffin layer preventing any moisture that may be contained in the said envelop from acting on the members of the generator.

I claim—

1. An ammonia-generator comprising an inclosing soluble member, and an inner soluble member or core, the inclosing member having orifices which receive liquid and conduct it to the inner member.

2. An ammonia-generator comprising an inclosing soluble member, and an inner soluble member or core, the inclosing member having orifices which receive liquid and conduct it to the inner member and are sealed at their outer ends by penetrable and relatively insoluble caps.

3. An ammonia-generator comprising an inclosing soluble member, and an inner soluble member or core, the inclosing member having a shell which is relatively insoluble, and orifices which extend to the inner member.

4. An ammonia-generator comprising an inclosing soluble member, and an inner soluble member or core, the inclosing member having a shell which is relatively insoluble, and orifices which extend to the inner member and are closed at their outer ends by parts of said shell.

5. An ammonia-generator comprising an inclosing soluble member, and an inner soluble member or core, the inner member being loose within the outer member, so that a space exists between the two members, while the outer member has orifices extending to said space.

6. A soluble ammonia-generator comprising a rotatable inclosing member, and an inner member or core, the inclosing member having orifices which are tangentially arranged, whereby the gases generated by the entrance of water into said orifices are caused to rotate the generator.

7. A soluble ammonia-generator comprising a spherical hollow outer member, and a spherical inner member or core within the outer member, the outer member having tangential orifices.

8. A soluble ammonia-generator comprising an inclosing member, and an inner member or core, the inclosing member having a shell which is relatively insoluble, and orifices which extend to the inner member, said shell being composed of an inner layer $d^2$ and an outer layer $d$.

In testimony whereof I have affixed my signature in presence of two witnesses.

JAMES A. YOUNG.

Witnesses:
F. FRANK MARSH,
SYDNEY TAYLOR.